United States Patent [19]
Cardoza

[11] 3,851,575
[45] Dec. 3, 1974

[54] BALER WIRE TENSION CONTROL ASSEMBLY

[75] Inventor: Joe Cardoza, Dos Palos, Calif.

[73] Assignee: John R. Cardoza, Dos Palos, Calif.

[22] Filed: Aug. 23, 1973

[21] Appl. No.: 390,860

[52] U.S. Cl................. 100/4, 100/17, 100/43, 100/192
[51] Int. Cl................ B65b 13/18, B30b 15/26
[58] Field of Search.......... 100/3, 4, 17, 18, 43, 192

[56] References Cited
UNITED STATES PATENTS

| | | | |
|---|---|---|---|
| 2,576,784 | 11/1951 | Dodds et al | 100/43 |
| 2,613,590 | 10/1952 | Graybill | 100/43 |
| 2,704,508 | 3/1955 | Hansen | 100/43 |
| 2,718,189 | 9/1955 | Bornzin | 100/43 |
| 2,758,536 | 8/1956 | Lauck | 100/43 |
| 2,844,092 | 7/1958 | Davis | 100/43 |
| 3,045,583 | 7/1962 | Davin | 100/4 |

*Primary Examiner*—Billy J. Wilhite
*Attorney, Agent, or Firm*—Clarence A. O'Brien; Harvey B. Jacobson

[57] ABSTRACT

A baler compression or control assembly responsive to tension developed in the baling wire between the leading end of the new bale and the knotting apparatus comprising a pivotally mounted wire guide link connected to a valve controlling lever in the hydraulic system which operates the pressure or tension rails.

6 Claims, 4 Drawing Figures

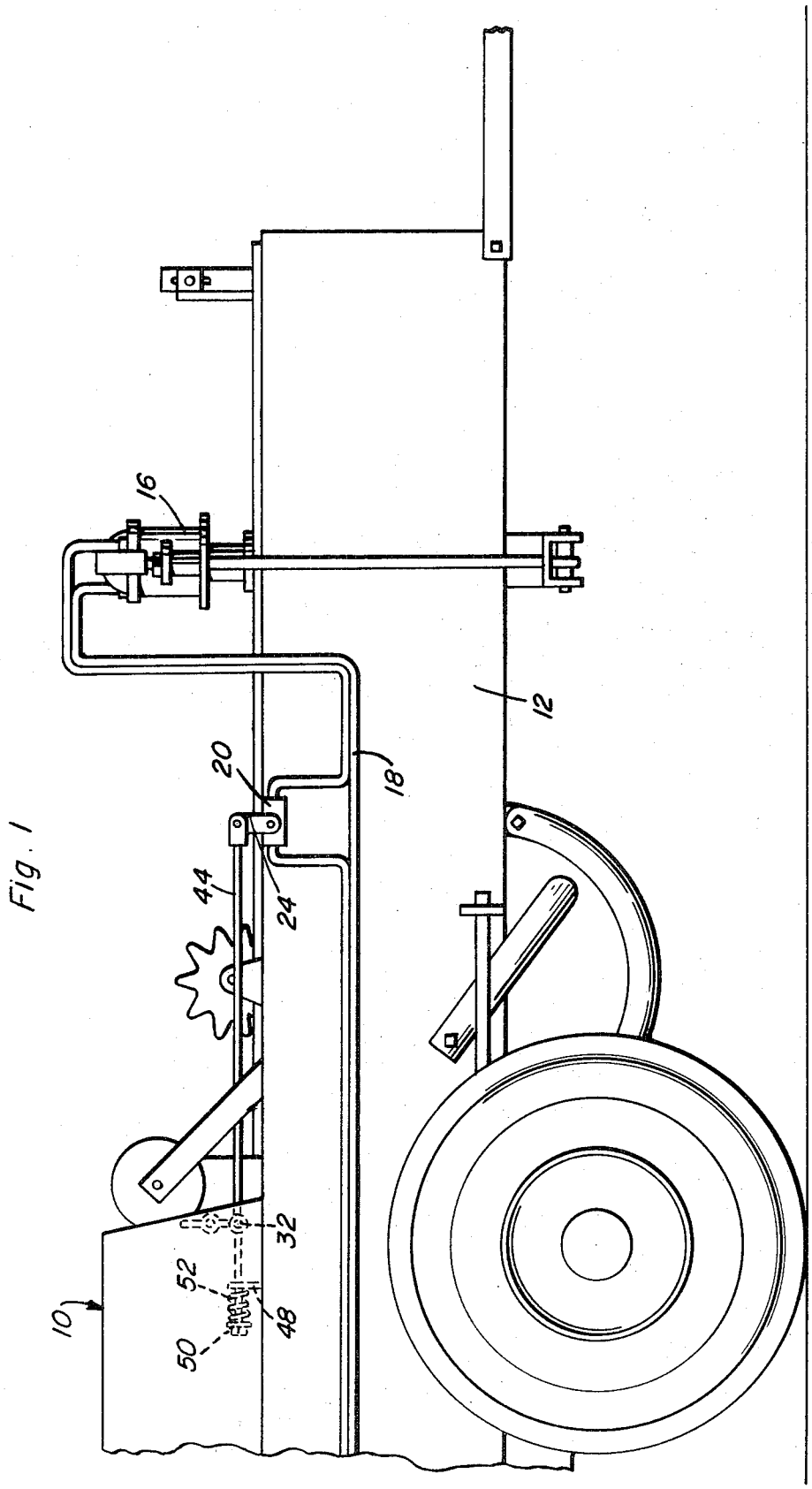

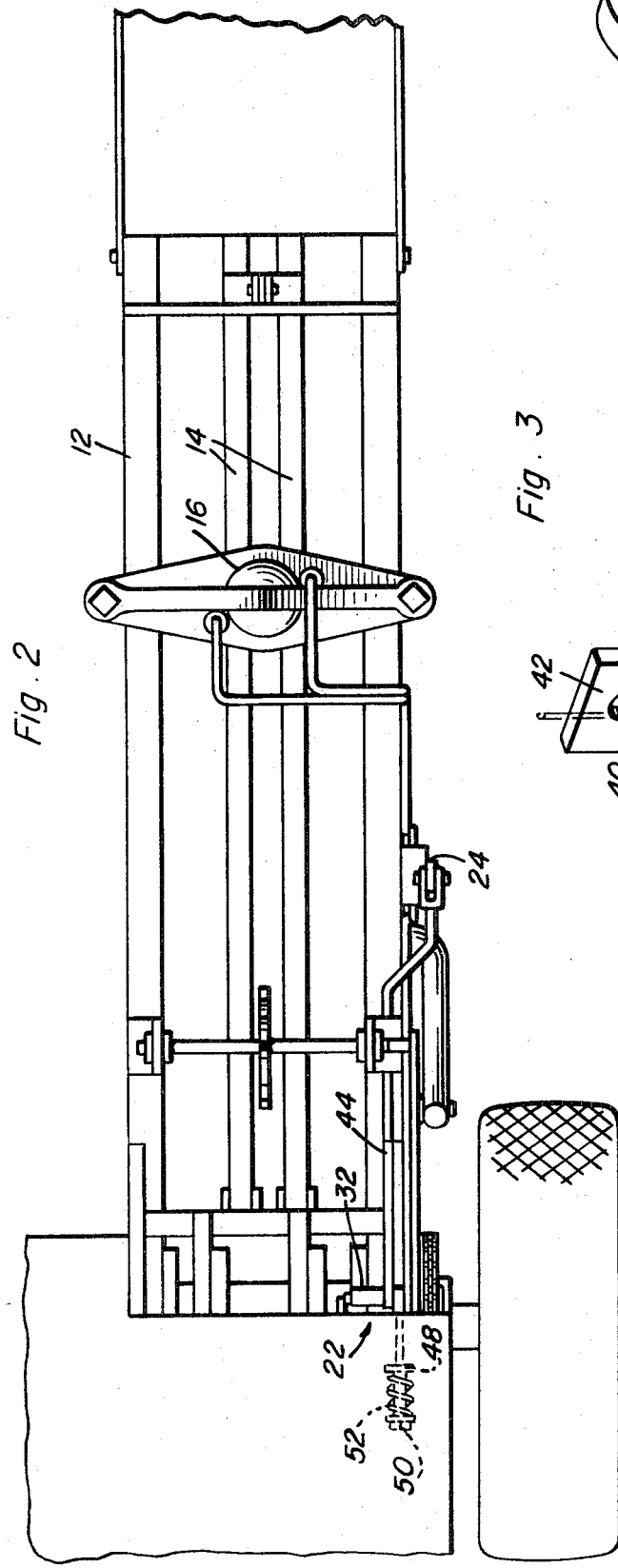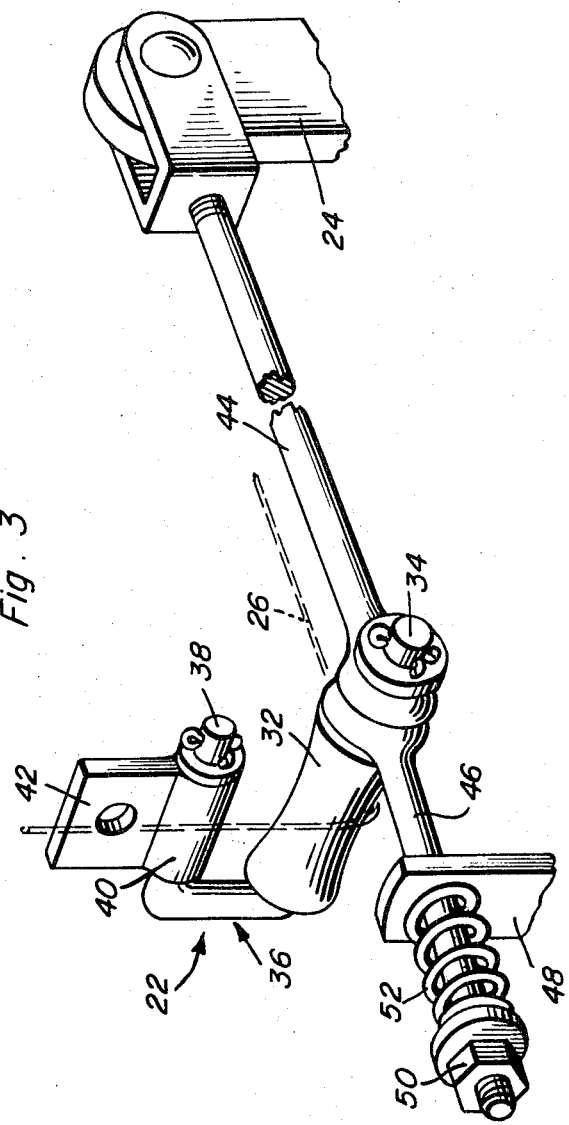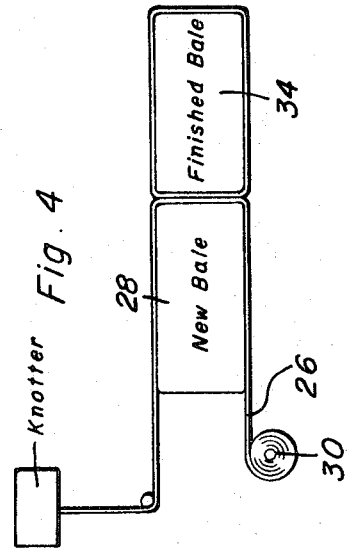

BALER WIRE TENSION CONTROL ASSEMBLY

The present invention relates to new and useful improvements in automatic bale compaction control means, and is more particularly concerned with control means responsive to tension developed in the baling wire or cord.

In balers for hay, straw, or the like, it is particularly desirable that bales of substantially uniform density be produced. Accordingly, such balers are normally provided with either top or side mounted tension rails which can be manipulated so as to reduce the cross-sectional area of the bale forming chamber. The bale forming chamber normally includes at least one finished bale and a new bale being pressure formed thereagainst. The reduction of the size of the bale chamber in effect locks the finished bale into position allowing for a continued compression of the new material thereagainst in the formation of the new bale. Once the desired density is achieved for the new bale, the tension rails are released and the previously finished bale discharged and the new bale knotted and moved into position for utilization as an abutment against which a new bale will be formed. The control of the tension or pressure rail is normally a manual control arrangement although some complex automatic control systems have been devised.

It is a primary object of the present invention to provide an automatic control system for achieving uniform bale density, which system is, although highly effective and exact in operation, of a structurally simple arrangement.

In the system of the invention, the control is effected through tension developed directly in the baling wire or cord itself effected through an increase in the frictional gripping of the wire between the finished bale and the new bale as the density thereof reaches a predetermined point. The use of a wire tension responsive system enables the utilization of a control assembly which is compact, trouble free in operation, and easily adapted to substantially every type of baler incorporating hydraulically operated tension or pressure rails.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIG. 1 is a side elevational view of a baler incorporating the control assembly of the invention;

FIG. 2 is a top plan view of the baler portion of FIG. 1;

FIG. 3 is an enlarged perspective view of the wire tension responsive control assembly; and FIG. 4 is a schematic illustration of the invention.

Referring now more specifically to the invention, reference numeral 10 is used to designate a conventional baler incorporating a knotter, an elongated baling chamber 12 with associated pressure or tension rails 14 and a hydraulic ram or unit 16 in conjunction with an appropriate hydraulic system 18 and valve control 20 therefor. The valve 20 when opened allows for an introduction of fluid under pressure to the ram 16, which in turn extends so as to move the tension rails 14 inwardly relative to the bale chamber 12 and restrict the size thereof. An opening of the valve 20 allows for fluid bypass and a corresponding release of pressure on the tension rails 14 and an expansion of the bale chamber 12 for a release of the finished bale. This contruction is basically conventional with the invention residing in a unique control assembly 22 operatively connected to and controlling the valve 20 through a vertical control lever 24 on the valve 20.

The control assembly 22 is mounted on the baler 10 along the path taken by the baling wire or cord 26 at a point between the knotter and the new bale 28 being formed. The wire or cord, hereinafter referred to as wire, will originate at a conventionally mounted wire roll or supply 30.

The control assembly 22 includes a wire guiding roller 32 mounted on an elongated rod-like axle 34 which constitutes one leg of a U-shaped mounting member 36, the other leg 38 of which is rotatably mounted within a sleeve 40 having an upstanding apertured mounting lug 42 thereon. The apertured mounting lug 42 is bolted to the baler 10 in a position whereby the depending wire guiding roller 32 will receive the baling wire thereabout as the wire 26 angles upwardly toward the knotter. In most instances, the pivotally mounted roller 32 will be substituted for the conventional fixed wire guide.

The rod axle 34 for the roller 32 is link connected to the upper end of the control lever 24 by an elongated rigid link 44 pivotally fixed at one end to the lever 24 and at the other end to the axle 34.

A second link 46, also pivoted at one end to the axle 34, extends outwardly therefrom, normally in a direction diametrically opposed from the first link 44, and through an enlarged aperture within an appropriate rigid lug or plate 48 mounted on the baler. The remote end of the link 46 includes an enlarged abutment forming adjustable threaded nut and washer 50 with an appropriate expanded coil compression spring 52 engaged between the abutment 50 and the plate 48. This spring 52, through the links 44 and 46, maintains the valve lever 24 in a position, preadjusted through the nut 50 on the threaded end of the link 46, so as to maintain the hydraulic ram at a bale clamping extended position which in effect locks the finished bale 54 in position so as to provide a stationary abutment for the new bale 28 being formed.

The wire 26, feeding off the supply 30, engages the leading face of the new bale 28 as it is being formed. This wire 26 moves freely off the supply roll, about the leading end of the new bale 28 and upwardly about the guide roller 32. However, as the new bale 28 begins to pack against the finished bale 54, and the denisty of the new bale approaches the desired level, the frictional engagement between the adjoining ends of the bales 28 and 54 will effect a clamping of the wire 26 which in turn will develop a tension in the wire 26 between the bale clamped portion thereof and the knotter above the wire angling roller 32. This in turn will cause a pivoting of the roller 32 against the biasing force of the spring which results in a swinging of the valve lever 24 and a release of the pressure in the ram 16. This in turn releases the finished bale and allows for the normal sequence of operations to follow, including the completion of the new bale and the outward movement thereof in conjunction with the reactivation of the ram 16 so as to clamp this newly finished bale. It will be appreciated that the link receiving aperture through the lug or plate 48 is sufficient so as to accommodate an angular displacement of the link 46 as the guide roller 32 follows an arcuate pivotal movement under the influence of the tension wire 26.

From the foregoing, it will be appreciated that a simple although highly unique means has been deviced for automatically controlling the density of a bale. The apparatus is easily adapted to substantially any conventional baler and operative in conjunction therewith in a trouble free manner in no way affecting the basic operation of the baling apparatus itself.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A tension control assembly for balers wherein bales are progressively tied with the baling wire passing between a finished bale and the next bale being formed, said baler including a bale chamber, hydraulic pressure means selectively varying the size of the bale chamber, a valve control for said pressure means, a knotter, and a wire path extending from a roll supply about the leading end of a new bale between the new bale and the last finished bale and to the knotter, said control assembly being operatively connected to said valve control for a selected actuation thereof, said control assembly being interposed along the wire path between the leading end of the new bale and the knotter for engagement by the baling wire and a sensing of the tension therein to effect a corresponding selective actuation of the pressure means valve control.

2. The assembly of claim 1 including a control lever on said valve, a wire guide, and link means engaged between said lever and said wire guide in a manner whereby a tensioning of the wire will effect the transmittal of a force from said wire guide through said link means to said lever for a corresponding movement thereof and an actuation of said valve control.

3. The assembly of claim 2 wherein said wire guide comprises a roller, a roller axle for said roller, said roller being pivotally mounted about an axis parallel to and spaced from said roller axle, said link means including a first rigid link pivoted at one end to said lever and at the second end to said roller axle, whereby a predetermined tensioning of the wire will effect a pivotal swinging of the wire guide and a movement of the lever.

4. The assembly of claim 3 wherein said link means includes a second link, said second link having a first end pivotally mounted on said roller axle, said second link extending from said first end outwardly therefrom, and resilient biasing means engaging said second link means and biasing said second link means and the wire guide against wire tension induced movement.

5. The assembly of claim 4 including a fixed plate, an aperture through said plate, said second link being received through said plate and terminating in a second end to the opposite side of said plate from the first end thereof, abutment means on the second end of said second link, said resilient biasing means comprising a spring engaged between said plate and said abutment means.

6. A baler, a baling wire controlled bale tensioning system comprising a baling chamber, pressure means for varying the size of the chamber, hydraulic means operating said pressure means, a valve controlling said hydraulic means, a knotter, a supply of baling wire for engagement about the bale being formed and extension to said knotter, and a valve actuating assembly positioned along the path of the wire, said wire engaging said assembly, said assembly being responsive to a predetermined tension in said wire for a selective actuation of the valve.

* * * * *